(12) United States Patent
Wache

(10) Patent No.: US 8,931,784 B2
(45) Date of Patent: Jan. 13, 2015

(54) GAITER

(71) Applicant: Carl Freudenberg KG, Weinheim (DE)

(72) Inventor: Hans-Martin Wache, Eggersdorf (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 14/071,755

(22) Filed: Nov. 5, 2013

(65) Prior Publication Data

US 2014/0131955 A1    May 15, 2014

(30) Foreign Application Priority Data

Nov. 13, 2012   (EP) ..................................... 12007686

(51) Int. Cl.
  *F16J 3/00*  (2006.01)
  *F16J 15/02* (2006.01)
  *F16D 3/84*  (2006.01)

(52) U.S. Cl.
  CPC .............. *F16J 15/022* (2013.01); *F16D 3/845* (2013.01)
  USPC .......................................... 277/634; 277/636

(58) Field of Classification Search
  USPC .......................................... 277/634, 635, 636
  See application file for complete search history.

(56) References Cited

U.S. PATENT DOCUMENTS

| 6,832,763 | B2* | 12/2004 | Huchet et al. ................. 277/634 |
| 7,585,227 | B2* | 9/2009 | Ohshita ......................... 464/175 |
| 8,028,999 | B2* | 10/2011 | Wolf et al. .................... 277/634 |
| 2009/0194953 | A1* | 8/2009 | Sueoka et al. ................ 277/636 |
| 2010/0084826 | A1* | 4/2010 | Wolf et al. .................... 277/636 |

FOREIGN PATENT DOCUMENTS

| EP | 1182372 A2 | 2/2002 |
| EP | 1273834 B1 | 9/2007 |
| JP | 2006118612 A | 5/2006 |
| JP | 2008082431 A | 4/2008 |

* cited by examiner

*Primary Examiner* — Gilbert Lee
(74) *Attorney, Agent, or Firm* — Leydig, Voit & Mayer, Ltd.

(57) ABSTRACT

A gaiter includes a bellows formed of a rubber resilient material and extending in an axial direction from a first end to a second end. The bellows includes at least two pocket-shaped bulges on an end face at the first end of the bellows that are formed integrally with the bellows from the rubber resilient material. The bulges extend radially inwards and in a circumferential direction of the end face. Each of the bulges have two flanks disposed adjacent to one another with an axial spacing therebetween. The bulges are configured to be placed in a sealing manner on a congruently configured pivot of a joint.

16 Claims, 6 Drawing Sheets

GAITER

CROSS-REFERENCE TO PRIOR APPLICATION

Priority is claimed to European Patent Application No. EP 12 007 686.4, filed on Nov. 13, 2012, the entire disclosure of which is hereby incorporated by reference herein.

FIELD

The invention relates to a gaiter, comprising a bellows consisting of a rubber resilient material. The invention also relates to a gaiter arrangement, comprising a bellows on a pivot of a joint. The gaiter, or boot, can be used on vehicles to protect joints.

BACKGROUND

A gaiter is known from EP 1 273 834 B1. The bellows of the previously known gaiter comprises in the region of one of its front faces three tripod elements which are distributed uniformly in the circumferential direction and extend radially inwards, each tripod element having at least two fins which are adjacent to one another in a spacing in the axial direction and are each configured as sealing elements and can be placed in a sealing manner onto a pivot of a congruently configured tripod joint. The bellows, the tripod elements and the fins are configured to merge integrally into one another and are made of the same material and are primary formed in a single-stage blow moulding process. At least one supporting web for the mutual support of the fins is respectively arranged within the axial spacing between fins which are axially adjacent to one another.

SUMMARY

In an embodiment, the present invention provides a gaiter of the type mentioned at the outset such that it can be produced even more easily by simplifying the shape.

In an embodiment, the present invention provides a gaiter. The gaiter includes a bellows formed of a rubber resilient material and extending in an axial direction from a first end to a second end. The bellows includes at least two pocket-shaped bulges on an end face at the first end of the bellows that are formed integrally with the bellows from the rubber resilient material. The bulges extend radially inwards and in a circumferential direction of the end face. Each of the bulges have two flanks disposed adjacent to one another with an axial spacing therebetween. The bulges are configured to be placed in a sealing manner on a congruently configured pivot of a joint.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
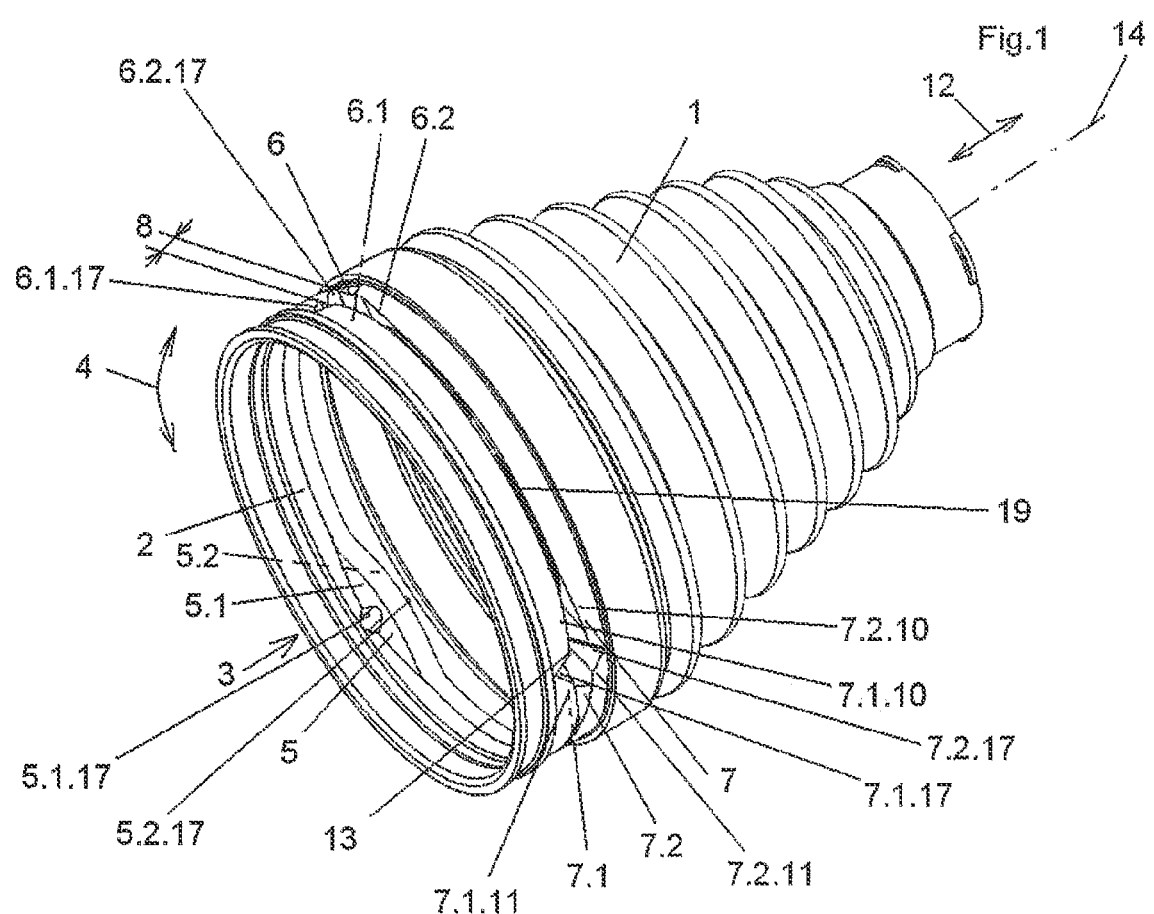
FIG. 1 is a perspective view of a gaiter in the region of the end face, by which it can be attached to a congruently configured pivot of a joint.

In an embodiment, a gaiter is provided which comprises a bellows consisting of rubber resilient material, which bellows has on the end face at one end at least two pocket-shaped bulges which extend radially inwards and in the circumferential direction of the end face of the bellows, the bulges having in each case two flanks arranged adjacently to one another with an axial spacing, it being possible for the bulges to be placed in a sealing manner on a congruently configured pivot of a joint and the bellows and the bulges being formed integrally and from the same material. On the one hand, the bulges produce a seal for the lubricant of the joint from the surroundings and on the other hand, contaminants are prevented from penetrating inside the joint from the surroundings, thereby possibly resulting in the joint becoming damaged or destroyed.

According to an advantageous configuration, the bellows can have three bulges which are configured as tripod elements and are distributed uniformly in the circumferential direction.

An embodiment of the gaiter which can be produced in a particularly simple and cost-effective manner can be achieved in that each tripod element comprises only one bulge. Unlike tripod elements which consist in each case of a plurality of relatively delicate lamellar bulges, the only one bulge per tripod element has a comparatively greater dimensional stability due to the relatively stable configuration, with overall approximately the same dimensions, so that in particular the assembly of the bellows is simplified and the risk of assembly errors is reduced to a minimum.

For many cases of use, it is advantageous if the ratio of the greatest radial depth of each bulge to the axial spacing between the corresponding mutually adjacent flanks of the bulge is from 1.5 to 2.5. As a result, the dimensional stability of the bulges, especially in the axial direction is great enough in order to be able to mount the bellows in a simple and procedurally reliable manner.

Each bulge can have at least two fins which are arranged adjacently at a spacing from one another in the axial direction and are each configured as sealing elements and can be placed in a sealing manner onto an axle pivot of a congruently configured tripod joint. The sealing action by the gaiter on the axle pivot of a tripod joint is particularly effective due to the fins.

The bellows can be configured as a protective boot. As a result, the bellows can effectively follow axial, radial or cardanic movements of the pivot on which the bellows is mounted. The low mechanical stresses which act on the bellows mean that the bellows has consistently good use characteristics over a long service life.

The bellows, together with the bulges can be primary formed in one stage by a blow moulding process. A blow moulding process of this type is particularly effective in producing bellows which consist of a thermoplastic elastomer.

Each flank can have radially on the outside an arching which extends radially outwards and in the circumferential direction and/or can have an elevation which extends in the axial direction. The effect of the arching and/or elevation is that the gaiter can be fixed on the pivot of the joint in a particularly reliable and impermeable manner. A particularly advantageous configuration provides that each flank has an arching and an elevation.

During the intended use of the gaiter, the archings and/or elevations of the flanks are enclosed by a clamping strip which attaches the gaiter to the pivot. The clamping strip encloses the gaiter on the end face in the region of the archings and/or elevations and thereby flattens the archings and/or elevations, the elastomeric material of the archings and/or elevations which is displaced inwards into the respective bulge in the radial direction braces the gaiter in this region with the joint and thereby provides a secure fixing of the two parts on one another.

Viewed in the circumferential direction, the archings can be configured in the shape of domes over the center of the respective bulges. More preferably, viewed in the circumferential direction, the archings can be configured symmetrically over the center of the respective bulges. A configuration of this type provides a straightforward attachment of the clamping strip onto the end face of the gaiter and produces a uniform displacement of the elastomeric material of which the archings consist. Undesirably high tension peaks in the elastomeric material are prevented by a configuration of this type.

The same applies accordingly to the elevations.

An advantageous configuration provides that the two flanks, arranged adjacently to one another with an axial spacing, of the respective bulge jointly have radially on the outside, when viewed in the axial direction, a substantially pitched roof-shaped surface, which is formed by the elevations. The elevations of mutually axially adjacent flanks can each be wedge-shaped and can be arranged inclined in opposite directions, based on the axis of symmetry of the bellows and can each enclose with the axis of symmetry of the bellows an angle which is at most 20°. The magnitude of said angle influences the displaced volume of the elevations when the bellows is assembled on the pivot by the clamping strip. The greater these angles, the greater too the displaced volume during the assembly of the bellows on the pivot and the greater the resilient pretension with which the end face of the bellows encompasses the pivot. For most cases of use, it is advantageous if the angles are 5° to 15°. However, angles greater than 20° are less appropriate, because such angles make it virtually impossible for the clamping strip to press against and seal the end face of the bellows in the circumferential direction with a substantially uniform radial pretension on the pivot.

The angles of the elevations are preferably the same size. As a result, a consistent compression radially inwards is achieved in the region of both elevations.

Each flank can have at least one reinforcing rib which extends transversely thereto and extends from the respective arching radially inwards into the respective bulge. The purpose of the reinforcing ribs is to stabilise the bulges in the axial direction and as a result, to ensure a good sealing of the bellows in the region of the bulges.

The reinforcing ribs of mutually axially adjacent flanks of a bulge can be arranged opposite one another in the axial direction and in the circumferential direction in the center of the respective bulge. The reinforcing ribs of mutually axially adjacent flanks can project out of the respective flanks from the respective bulge in an axially opposite direction and can be axially remote from one another. Consequently, the support of the bulge in the axial direction is particularly effective.

In another embodiment, the invention provides an improved gaiter arrangements over known arrangements where the bellows are configured as a tripod bellows with tripod elements and are attached to a tripod joint.

In particular, the gaiter arrangement is improved such that the bellows and the joint can be connected together in a more robust manner and such that the connection has good use characteristics, in particular in respect of an effective seal between bellows and joint, during a long service life.

In an embodiment, a gaiter arrangement is provided which comprises a pivot of a joint and a bellows, as previously described, which bellows is arranged on the pivot and the end face of which, having the bulges and archings and/or elevations is encompassed by a clamping strip with radial pretension and flattening of the archings and/or elevations. Due to the flattening of the archings and/or elevations by means of the clamping strip when the bellows is assembled on the pivot of the joint, the bellows has particularly dimensionally stable bulges which ensure a tight connection with the pivot specifically in this region during a long service life.

Figure 3:
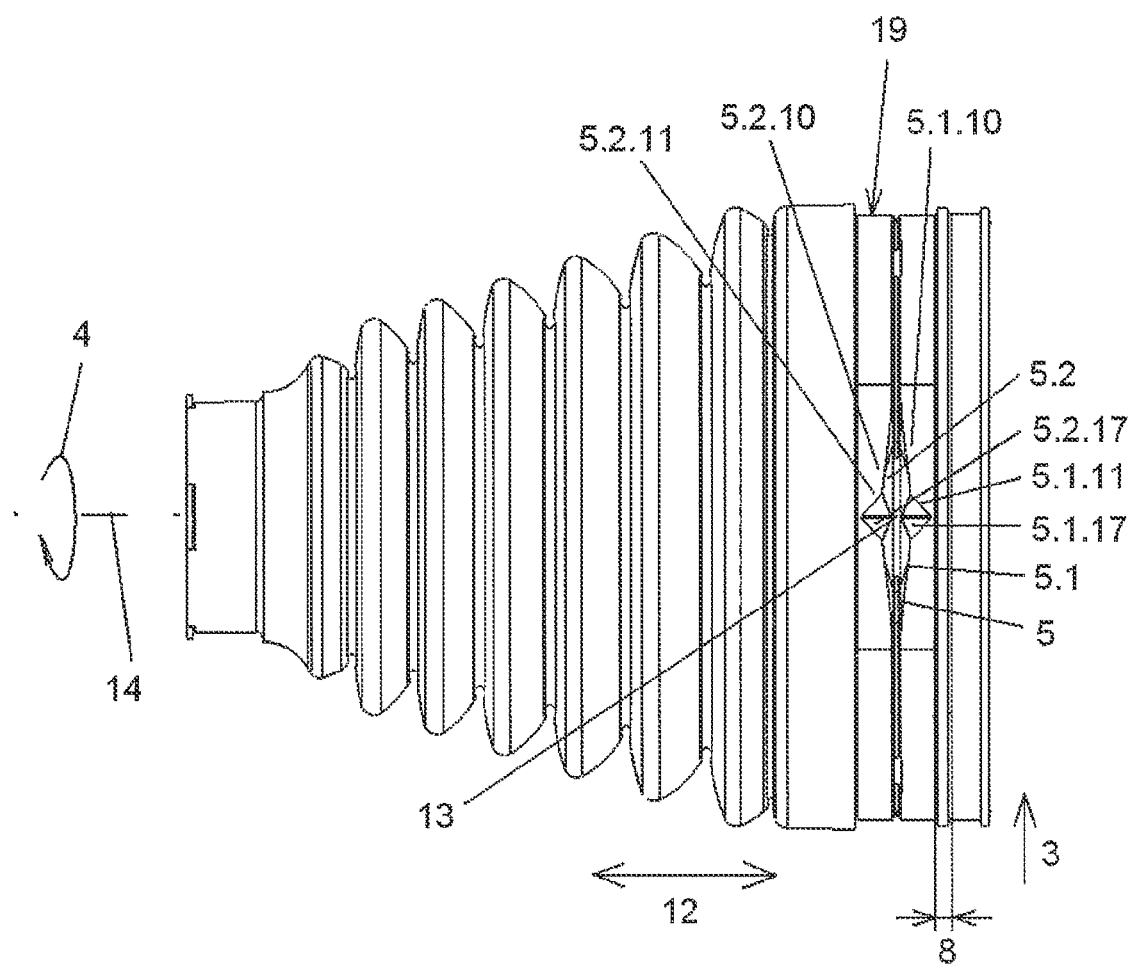
FIG. 3 is a view of the gaiter of FIGS. 1 and 2 onto one of the pocket-shaped bulges.
Figure 4:
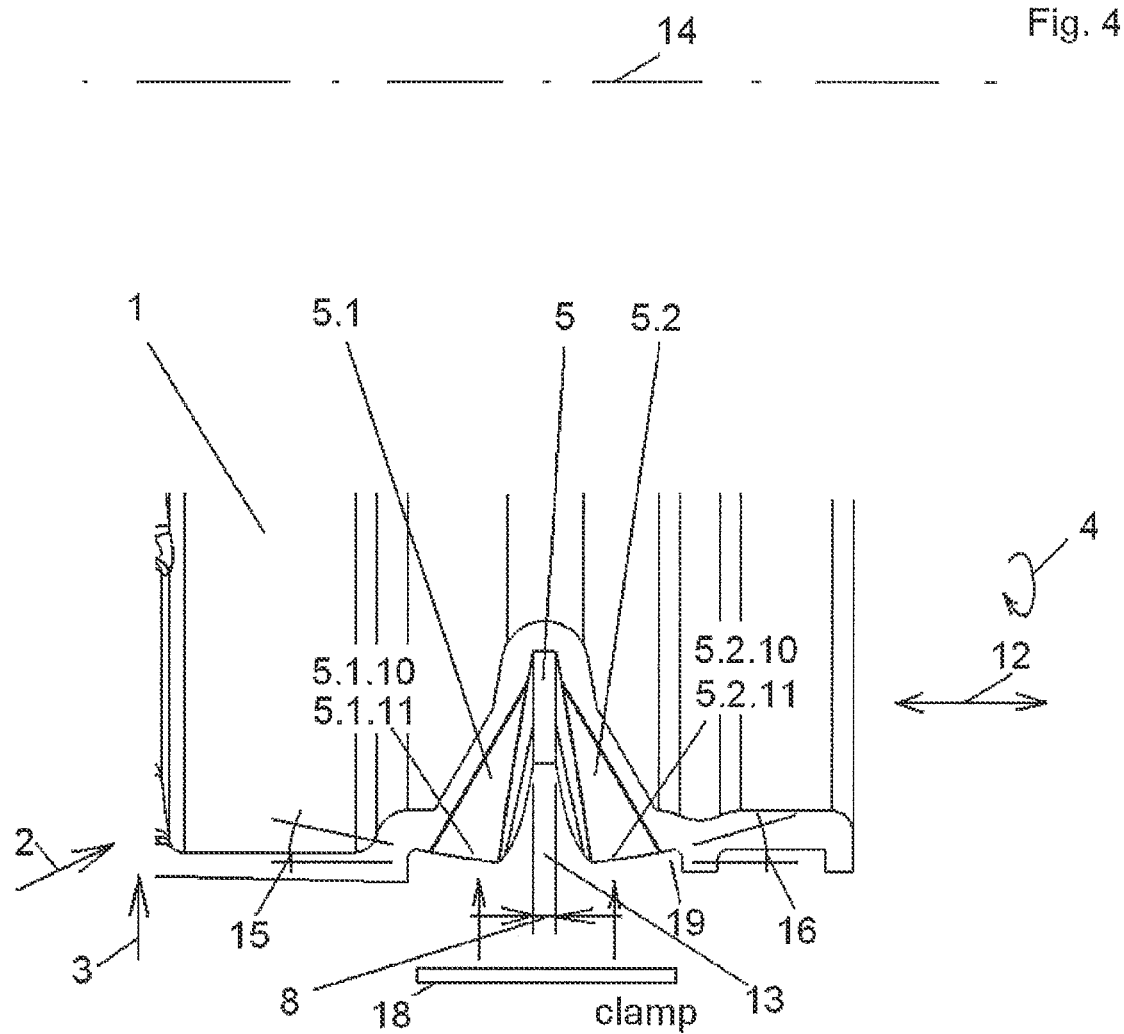
FIG. 4 shows the archings of flanks, arranged axially adjacently to one other, of a bulge, as well as elevations of the flanks.
Figure 5:
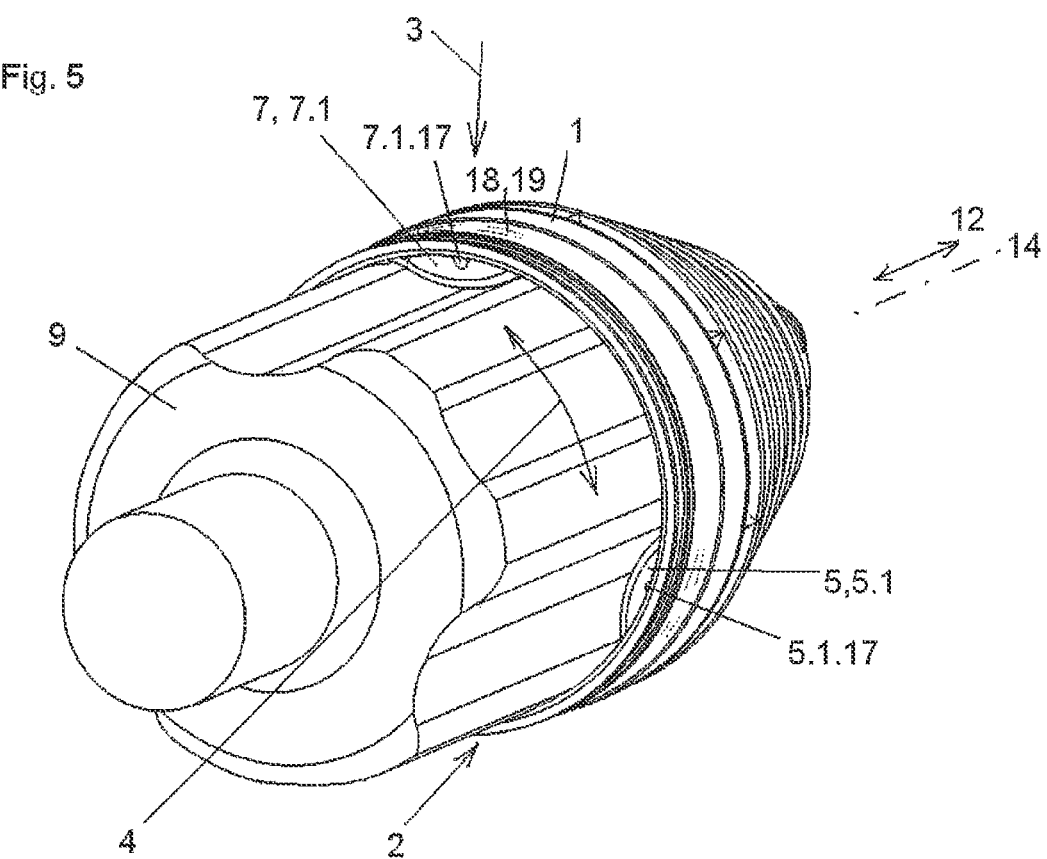
FIG. 5 shows the gaiter of FIGS. 1 to 4 which is attached to the pivot of a joint by a clamping strip.

FIGS. 1 to 4 show an example of a gaiter according to the invention and FIG. 5 shows a gaiter arrangement according to the invention with a gaiter of this type.

FIG. 1 is a perspective view of the gaiter. The gaiter comprises a bellows 1 which is configured as a protective boot and consists of a rubber resilient material, and in this embodiment, it consists of a thermoplastic elastomer. In the region of its one end face 2, the bellows 1 has three bulges 5, 6, 7 which are configured as tripod elements, are distributed uniformly in the circumferential direction and extend radially inwards 3 in the circumferential direction 4 of the end face 2. The three bulges 5, 6, 7 are of the same configuration and have in each case two flanks 5.1, 5.2, 6.1, 6.2, 7.1, 7.2 which are arranged adjacently to one another with an axial spacing 8. The bellows 1 and the bulges 5, 6, 7 together with the flanks thereof 5.1, 5.2, 6.1, 6.2, 7.1, 7.2 are formed integrally and of the same material and are produced by a one stage blow moulding method.

To achieve an improved fixing of the end face 2 of the bellows 1 on the pivot 9 of the joint, the bellows has archings 5.1.10, 5.2.10, 6.1.10, 6.2.10, 7.1.10, 7.2.10 and also elevations 5.1.11, 5.2.11, 6.1.11, 6.2.11, 7.1.11, 7.2.11. The archings 5.1.10, 5.2.10, 6.1.10, 6.2.10, 7.1.10, 7.2.10 and the elevations 5.1.11, 5.2.11, 6.1.11, 6.2.11, 7.1.11, 7.2.11 are formed by accumulations of material which extend radially outwards and, in the assembled state of the gaiter shown in FIG. 5, are flattened by the clamping strip 18, thereby producing a substantially circular external diameter of the end face 2. The flattened archings 5.1.10, 5.2.10, 6.1.10, 6.2.10, 7.1.10, 7.2.10 and elevations 5.1.11, 5.2.11, 6.1.11, 6.2.11, 7.1.11, 7.2.11 produce in the region of the bulges 5, 6, 7 a reinforced resilient pretension of the bellows 1 on the pivot 9 of the joint and consequently produce a reliable and durable connection which is also impermeable.

Viewed in the circumferential direction 4, the archings 5.1.10, 5.2.10, 6.1.10, 6.2.10, 7.1.10, 7.2.10 are dome-shaped and are symmetrical over the center 13 of the respective bulges 5, 6, 7. The elevations 5.1.11, 5.2.11, 6.1.11, 6.2.11, 7.1.11, 7.2.11 also do not have any abrupt changes in direction. The two flanks 5.1, 5.2, 6.1, 6.2, 7.1, 7.2, arranged adjacently to one another with an axial spacing 8, of the respective bulges 5, 6, 7 jointly have radially on the outside, when viewed in the axial direction 12, a pitched roof-shaped surface. This pitched roof-shaped surface is produced by the elevations 5.1.11, 5.2.11, 6.1.11, 6.2.11, 7.1.11, 7.2.11 being wedge-shaped in each case and being arranged inclined in opposite directions.

Figure 2:
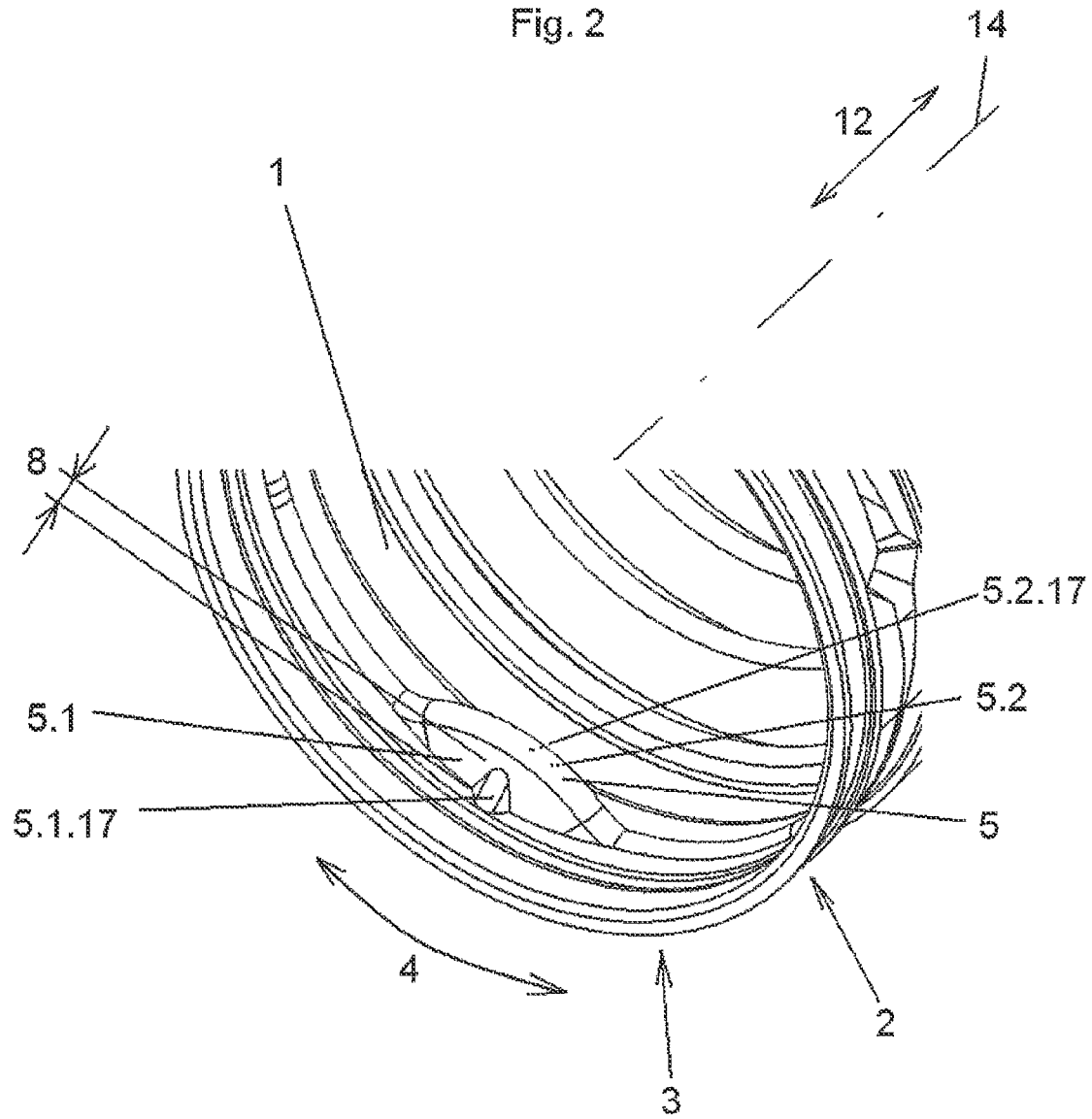
FIG. 2 shows an enlarged detail of the gaiter from FIG. 1, one of the pocket-shaped bulges being shown.

FIG. 2 shows an enlarged detail of the bellows 1 of FIG. 1. FIG. 2 is a view of one of the bulges 5, 6, 7 which extend radially inwards 3 and in the circumferential direction 4 of the end face 2. To primarily axially support the bulge 5, each flank 5.1, 5.2 has a reinforcing rib 5.1.17, 5.2.17 which extends transversely to the flank 5.1, 5.2, although the flank 5.2 located axially in the bellows 1 with its corresponding reinforcing rib 5.2.17 cannot be seen in this view.

The reinforcing ribs 5.1.17, 5.2.17 extend from the respective arching 5.1.10, 5.2.10 radially inwards 3 into the bulge 5, are opposite one another in the axial direction 12 and are arranged in the circumferential direction 4 in the center 13 of the bulge 5 and project axially from the flanks 5.1, 5.2 in the opposite direction; therefore, they are remote from one another axially.

In FIG. 3, the bellows of FIG. 1 is shown in a view in which the bulge 5 can be seen from the outside, whereas it is shown from the inside in FIG. 2.

In the region of the bulge 5, the flanks 5.1, 5.2 are provided on the outer periphery with the previously described archings 5.1.10, 5.2.10 and elevations 5.1.11, 5.2.11 and, viewed in the circumferential direction 4, the reinforcing ribs 5.1.17 and 5.2.17 are arranged in the center 13 of the bulge 5.

The bulges 5, 6, 7, the archings 5.1.10, 5.2.10, 6.1.10, 6.2.10, 7.1.10, 7.2.10 and elevations 5.1.11, 5.2.11, 6.1.11, 6.2.11, 7.1.11, 7.2.11 of the flanks 5.1, 5.2, 6.1, 6.2, 7.1, 7.2 and also the reinforcing ribs 5.1.17, 5.2.17, 6.1.17, 6.2.17, 7.1.17, 7.2.17 are arranged on the end face of the bellows 1 in a track 19 which is in the shape of a groove and extends in the circumferential direction 4 around the end face 2 of the bellows 1, the clamping strip 18 being arranged in the track 19 during the intended use of the gaiter, as will be shown later on in FIG. 5. The bulges 5, 6, 7 with the reinforcing ribs 5.1.17, 5.2.17, 6.1.17, 6.2.17, 7.1.17, 7.2.17 have an axial width which substantially corresponds to the axial width of the track 19 and to the axial width of the clamping strip 18.

The archings 5.1.10, 5.2.10, 6.1.10, 6.2.10, 7.1.10, 7.2.10 and the elevations 5.1.11, 5.2.11, 6.1.11, 6.2.11, 7.1.11, 7.2.11 will be described in more detail in the following with reference to FIG. 4.

FIG. 4 shows a detail of the end face 2 of the bellows 1 in the region of the track 19. Here, it is possible to see the radially outwardly directed material accumulations which are formed by the archings 5.1.10, 5.2.10 and by the elevations 5.1.11, 5.2.11. The elevations 5.1.11, 5.2.11 are wedge-shaped, are inclined in opposite directions and together form the pitched-roof-shaped surface, the angles 15, 16 enclosed by the elevations 5.1.11, 5.2.11 with the axis of symmetry 14 being the same size and being between 5° and 10°.

Additionally, the clamping strip 18 is represented schematically in FIG. 4. After the bellows 1 has been attached onto the pivot 9, the track 19 is encompassed by the clamping strip 18 with radial pretension and flattening of the archings 5.1.10, 5.2.10, 6.1.10, 6.2.10, 7.1.10, 7.2.10 and of the elevations 5.1.11, 5.2.11, 6.1.11, 6.2.11, 7.1.11, 7.2.11. As a result, the rubber resilient material of the archings 5.1.10, 5.2.10, 6.1.10, 6.2.10, 7.1.10, 7.2.10 and of the elevations 5.1.11, 5.2.11, 6.1.11, 6.2.11, 7.1.11, 7.2.11 is displaced radially inwards into the bulges 5, 6, 7, thereby producing a particularly durable and impermeable connection of the bellows 1 to the pivot 9.

FIG. 5 shows the gaiter arrangement which shows the bellows 1 arranged on the pivot 9 of the joint. The archings 5.1.10, 5.2.10, 6.1.10, 6.2.10, 7.1.10, 7.2.10 and the elevations 5.1.11, 5.2.11, 6.1.11, 6.2.11, 7.1.11, 7.2.11 are flattened by the clamping strip 18 which is arranged in the track 19, so that the bulges 5, 6, 7, additionally supported by the reinforcing ribs 5.1.17, 5.2.17, 6.1.17, 6.2.17, 7.1.17, 7.2.17, are reinforced in shape.

Figure 6:
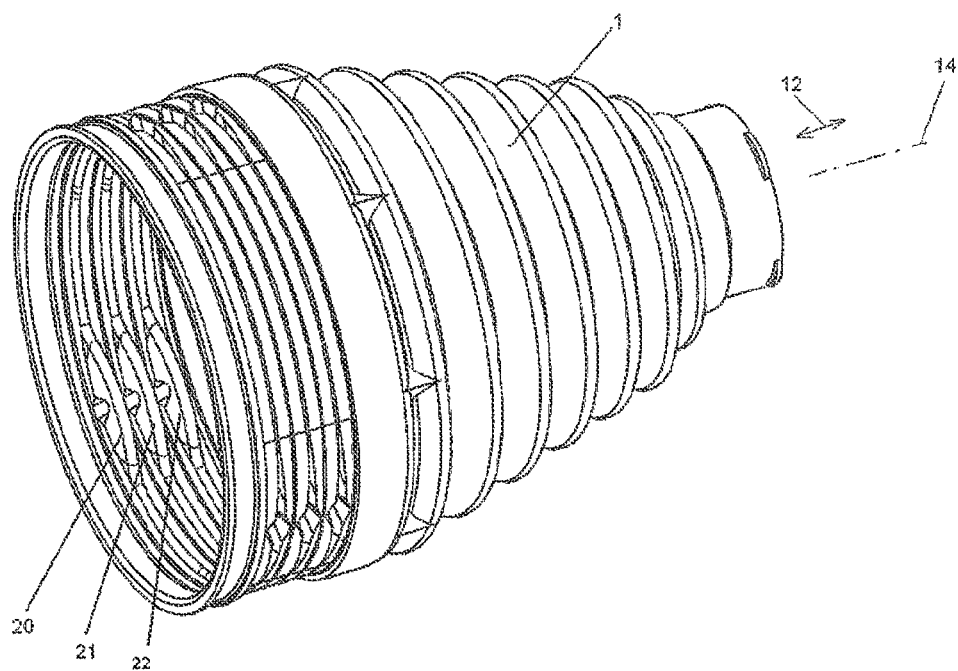
FIG. 6 shows a gaiter, similar to the gaiter of FIG. 1, with differently configured bulges.

FIG. 6 shows a gaiter, similar to the gaiter of FIG. 1, where each bulge 5, 6, 7 has at least two, in the embodiment three, fins 20, 21, 22 which are arranged adjacently to one another with a spacing in the axial direction. The fins 20, 21, 22 are configured in each case as sealing elements and can be placed in a sealing manner on the pivot 9 of a congruently configured tripod joint.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A gaiter, comprising:
   a bellows formed of a rubber resilient material and extending in an axial direction from a first end to a second end, the bellows including at least two pocket-shaped bulges on an end face at the first end of the bellows that are formed integrally with the bellows from the rubber resilient material, the bulges extending radially inwards and in a circumferential direction of the end face, each of the bulges having two flanks disposed adjacent to one another with an axial spacing therebetween, the bulges being configured to be placed in a sealing manner on a congruently configured pivot of a joint,
   wherein each of the flanks has, radially on an outside thereof, an arching which extends radially outwards and in the circumferential direction or has an elevation which extends in the axial direction.

2. The gaiter according to claim 1, wherein the bellows has three bulges which are configured as tripod elements and are distributed uniformly about the end face in the circumferential direction.

3. The gaiter according to claim 2, wherein each tripod element comprises only one of the bulges.

4. The gaiter according to claim 2, wherein each bulge has at least two fins which are arranged adjacently to one another with a spacing therebetween in the axial direction, are configured in each case as sealing elements mountable in a sealing manner on an axle pivot of a congruently configured tripod joint.

5. The gaiter according to claim 1, wherein the bellows is configured as a protective boot.

6. The gaiter according to claim 1, wherein the bellows is primarily formed together with the bulges in a one stage blow moulding process.

7. The gaiter according to claim 1, wherein the bellows consists of a thermoplastic elastomer.

8. The gaiter according to claim 1, wherein the archings are each configured in a shape of a dome over a center of the respective bulge, when viewed in the circumferential direction.

9. The gaiter according to claim 1, wherein the archings are each configured symmetrically over a center of the respective bulge, when viewed in the circumferential direction.

10. The gaiter according to claim 1, wherein the two flanks of the respective bulge jointly have, radially on an outside thereof, when viewed in the axial direction, a substantially pitched roof-shaped surface, which is formed by the elevations.

11. The gaiter according to claim 10, wherein the elevations of mutually axially adjacent flanks are configured to be wedge-shaped in each case and are arranged inclined in opposite directions, based on an axis of symmetry of the bellows, and enclose with the axis of symmetry of the bellows a respective angle which is at most 20°.

12. The gaiter according to claim 11, wherein the angles of both elevations are the same size.

13. The gaiter according to claim 1, wherein each of the flanks has at least one reinforcing rib which extends transversely to the flank and extends from the respective arching radially inwards into the respective bulge.

14. The gaiter according to claim 13, wherein the reinforcing ribs of mutually axially adjacent ones of the flanks of the respective bulge are arranged in a center of the respective bulge in the circumferential direction and opposite one another in the axial direction.

15. The gaiter according to claim 13, wherein the reinforcing ribs of mutually axially adjacent ones of the flanks) project out of the respective flanks from the respective bulge in axially opposite directions and are axially remote from one another.

16. A gaiter arrangement, comprising:
a pivot of a joint; and
a bellows formed of a rubber resilient material and extending in an axial direction from a first end to a second end, the bellows including at least two pocket-shaped bulges on an end face at the first end of the bellows that are formed integrally with the bellows from the rubber resilient material, the bulges extending radially inwards and in a circumferential direction of the end face, each of the bulges having two flanks disposed adjacent to one another with an axial spacing therebetween, wherein each of the flanks has, radially on an outside thereof, an arching which extends radially outwards and in the circumferential direction or has an elevation which extends in the axial direction, and wherein the bulges are congruently configured to and disposed in a sealing manner on the pivot of the joint; and
a clamping strip encompassing the end face with radial pretension and being disposed so as to flatten the arching or the elevations.

\* \* \* \* \*